(12) United States Patent
Harrison et al.

(10) Patent No.: US 12,103,613 B2
(45) Date of Patent: Oct. 1, 2024

(54) TRAILER DRIVE UNIT

(71) Applicant: PURPLE LINE LIMITED, Ipswich (GB)

(72) Inventors: Jonathan Harrison, Ipswich (GB); Ben Hawkins, Ipswich (GB)

(73) Assignee: PURPLE LINE LIMITED (GB)

( * ) Notice: Subject to any disclaimer, the term of this patent is extended or adjusted under 35 U.S.C. 154(b) by 1005 days.

(21) Appl. No.: 16/965,951

(22) PCT Filed: Feb. 1, 2019

(86) PCT No.: PCT/EP2019/052552
§ 371 (c)(1),
(2) Date: Jul. 29, 2020

(87) PCT Pub. No.: WO2019/149913
PCT Pub. Date: Aug. 8, 2019

(65) Prior Publication Data
US 2021/0039732 A1 Feb. 11, 2021

(30) Foreign Application Priority Data

Feb. 2, 2018 (GB) ...................................... 1801756

(51) Int. Cl.
*B62D 59/04* (2006.01)
*B60K 17/04* (2006.01)
*B60K 17/14* (2006.01)

(52) U.S. Cl.
CPC ............ *B62D 59/04* (2013.01); *B60K 17/043* (2013.01); *B60K 17/14* (2013.01)

(58) Field of Classification Search
CPC ....... B60K 17/14; B60K 17/043; B62D 59/04
(Continued)

(56) References Cited

U.S. PATENT DOCUMENTS 3,150,734 A * 9/1964 Duggar, Jr. ............... B64F 1/22
180/19.1
4,596,300 A 6/1986 Mankey

FOREIGN PATENT DOCUMENTS

DE 2711214 A1 1/1979
EP 2138387 A1 12/2009
(Continued)

OTHER PUBLICATIONS

Search Report for GB 1801756.6; Charles Ellwood; May 14, 2018; 3 pages.
(Continued)

*Primary Examiner* — Jacob D Knutson
*Assistant Examiner* — Felicia L. Brittman-Alabi
(74) *Attorney, Agent, or Firm* — Dicke, Billig & Czaja, PLLC (57) ABSTRACT

The present invention relates to a trailer drive unit in the form of a caravan mover comprising a motor 16 (drive means/drive device), a head 14 housing a roller 20 which are linked together by a gear mechanism 22. Specifically, the present invention provides a support and drive transmission system 22 located centrally on the roller 20 with the roller 20 being provided by a first lateral portion/roller 19 and a second lateral portion/roller 21. In this arrangement, the length of the lateral roller 10 portions 19, 21 are individually shorter than a single roller such that the torque created in the central drive transmission portion is significantly less.

18 Claims, 10 Drawing Sheets

(58) Field of Classification Search
USPC .......................................................... 180/11
See application file for complete search history.

(56) References Cited

FOREIGN PATENT DOCUMENTS

| EP | 3128299 A1 | 2/2017 | | |
|---|---|---|---|---|
| FR | 1031098 A | 6/1953 | | |
| GB | 2541673 A | * | 3/2017 | ............... B60K 1/02 |

OTHER PUBLICATIONS

International Search Report for PCT/EP2019/052552; Gabriele Julich; May 13, 2019; 6 pages.
International Preliminary Report on Patentability for PCT/EP2019/052552; Gabriele Julich; Apr. 28, 2020; 18 pages.

* cited by examiner

TRAILER DRIVE UNIT

FIELD OF THE INVENTION

The present invention relates to a roller for a trailer drive unit, a trailer drive unit comprising a roller and a method of driving a trailer. In particular, the present invention relates to a drive unit for a caravan which is typically known as a caravan mover.

BACKGROUND TO THE INVENTION

Trailers are unpowered vehicles which are designed to be coupled to and then moved by a powered vehicle, for example a car, van etc. Such trailers include caravans. Generally, caravans are towed to a suitable site by a car. Once at a site, the caravan is unhitched from the car and the caravan is moved onto a pitch. The driver can try to manoeuvre the caravan directly on to the pitch but this is frequently not possible due to the confined spaces etc. Caravans are unpowered but a person or group of people can manually push and/or pull the caravan to the pitch. Alternatively, a drive system such as a caravan mover can be used to move the caravan on to the pitch.

A caravan mover generally comprises a motor which is controlled by a user. The caravan mover includes engagement means whereby a roller is selectively pressed against or removed from the outer tread of a wheel of the caravan. Typically, a caravan mover includes a drive roller which is urged into contact with the outer tread of a wheel of the caravan. A motor is arranged to rotate the drive roller which, through contact with the outer tread of the wheel, thereby rotates the wheel of the caravan. The caravan generally includes a caravan mover on one or two opposed wheels on an axle. Accordingly, through the selective movement of each caravan mover and the respective caravan wheels, the caravan can be arranged to independently move forwards or backwards and can be turned in either direction.

The motor of a caravan mover requires an electrical power supply. This power source is generally provided by a leisure battery provided inside the caravan. Alternatively, if the caravan does not have a leisure battery, then a battery and charger may be specifically fitted inside the caravan. The installation of such a specific power system takes a significant amount of time and this, therefore, significantly increases the cost of having a caravan mover. The dedicated power source may be fitted and located underneath a bed or a seating area but this still takes up valuable space inside the caravan. Furthermore, the power supply system must penetrate through the caravan from the outside, where the caravan mover is located, to the inside, where the battery is located. This penetration inevitably creates potential problems and areas of weakness which could cause the integrity of the caravan to deteriorate over time.

Each retrospectively fitted caravan mover must be individually created and installed since the cables must be optimally routed and the lengths of the cables must be cut to the correct lengths. The cables need individual guides which are generally secured into the underside of the caravan.

The electric control system for the caravan mover is generally fitted inside the caravan next to the battery. Again, this requires cables to be individually secured and routed through the caravan to the external caravan mover.

Overall, the retrospective fitting of a caravan mover requires a bespoke system which is individually created and fitted to the caravan and thereby such caravan movers can be relatively expensive.

It is an aim of the present invention to overcome at least one problem associated with the prior art and they are referred to herein or otherwise.

SUMMARY OF THE INVENTION

According to a first aspect of the present invention there is provided apparatus for moving a trailer comprising a trailer drive unit and a mounting mechanism, the trailer drive unit comprising:
   drive means,
   a first lateral roller,
   a second lateral roller, and
   drive transmitting means located between the first lateral roller and the second lateral roller;
   wherein the drive transmitting means receives drive from the drive means and transmits the drive to the first lateral roller and the second lateral roller, and
   wherein the first lateral roller and the second lateral roller are arranged to move in an engagement direction between a first position and a second position and, in which, in the second position the first lateral roller and the second lateral roller are arranged to be urged against a ground contacting surface of a wheel in order to transmit drive from the drive means to the wheel.

The drive means may comprise drive device which preferably comprises a motor and more preferably an electric motor.

The drive means may comprise a drive device which may comprise a plurality of motors (electric motors).

The drive means (device) may comprise a first motor and a second motor.

The first motor may be arranged to (solely/independently) drive the first lateral roller and the second motor may be arranged to (solely/independently) drive the second lateral roller.

The first motor and the second motor may provide a single combined drive to simultaneously drive both the first lateral roller and the second lateral roller. The first motor and the second motor may provide a single combined drive which is transmitted through a single drive transmission means (mechanism/system) to simultaneously drive both the first lateral roller and the second lateral roller.

Preferably, in the first position, the first lateral roller and the second lateral roller are arranged to be disengaged (and/or spaced from) the ground contacting surface of the wheel (so as to prevent the transmission of drive from the drive means (motor(s)) to the wheel).

Preferably the apparatus comprises urging means to urge the first lateral roller and the second lateral roller in the engagement direction. The urging means may comprise a spring. Preferably the urging means biases the first lateral roller and the second lateral roller outwardly in the engagement direction.

Preferably the trailer drive unit comprises an engagement force transmitting system which transmits an engagement force (equally and/or simultaneously) to the first lateral roller and the second lateral roller.

Preferably the force transmitting system transmits the force along a central longitudinal axis of the trailer drive unit.

Preferably the force transmitting system transmits the force to a central longitudinal end of the first lateral roller and to a central longitudinal end of the second lateral roller.

Preferably the force transmitting system transmits the force to an outer longitudinal end of the first lateral roller and to an outer end of the second lateral roller.

Preferably the trailer drive unit comprises a longitudinal axis extending from a first longitudinal end to a second longitudinal end. Preferably the first lateral roller and the second lateral roller are arranged to rotate about a lateral axis of the trailer drive unit. Preferably the first lateral roller and the second lateral roller are arranged for rotation about a shaft(s) extending laterally across the trailer drive unit.

Preferably the engagement direction extends from the second longitudinal end to the first longitudinal end. Preferably the first lateral roller and the second lateral roller locate towards the second longitudinal end relative to the drive means (motor(s)) which locates towards the first longitudinal end.

Preferably the first lateral roller and the second lateral roller are arranged to move along the longitudinal axis.

Preferably the first lateral roller and is arranged to rotate about a shaft. Preferably the second lateral roller is arranged to rotate about a shaft. Preferably the first lateral roller and the second lateral roller are arranged to rotate about a communal drive shaft. Preferably the drive transmitting means transmits drive to the communal shaft. Preferably the communal shaft receives drive from the drive transmitting means at a position located between the first lateral roller and the second lateral roller. Preferably the communal shaft comprises a central engaging portion located between the first lateral roller and the second lateral roller wherein the central engaging portion receives drive from the drive means (motor(s)).

Preferably the first lateral roller is arranged to be urged against a first circumferential zone of the wheel and the second lateral roller is arranged to be urged against a second circumferential zone of the wheel and more preferably the first circumferential zone is located to one side of a mid-line of the wheel and the second circumferential zone is located to the other side of the mid-line of the wheel. Preferably the mid-line bisects the wheel and may bisect the ground engaging surface (tread) into two substantially equal zones (two substantially equal circumferential surfaces). The drive transmitting means may be arranged, in use, to be aligned with the mid-line of the wheel. The mid-line may comprises a plane through the middle of the wheel which bisects the wheel into two substantially equal disc sections.

Preferably the drive transmitting means is arranged to move towards the ground engaging surface of the wheel but contact of the first lateral roller and the second lateral roller with the ground engaging surface prevents the drive transmitting means contacting (or abutting) the ground engaging surface.

Preferably the mounting mechanism is suitable for securing the trailer drive unit to a trailer.

Preferably the first lateral roller and the second lateral roller are movably coupled to the mounting mechanism.

Preferably, in the second position, the drive transmitting means locates spaced from the ground contacting surface of the wheel.

Preferably the mounting mechanism comprises a frame. The mounting mechanism may comprise a carriage. The carriage may be movably coupled to the frame. The carriage may be constrained to move in the frame. The carriage may support the first lateral roller and the second lateral roller. The carriage may support the drive means (motor(s)). The carriage may support the drive transmitting means.

The frame may provide guide means to guide the movement of the trailer drive unit relative to the frame. The guide means may guide the trailer drive unit to move translationally (linearly) between the first position and the second position.

The apparatus may comprise actuation means.

The actuation means may comprise a manually operated mechanism. Preferably manual rotation of a shaft causes linear movement of the trailer drive unit.

The actuation means may comprise an electric motor.

The frame may comprise a first bracket and a second bracket. The frame may provide guide slots into which guide elements located on the trailer drive unit are slidably engaged.

Preferably the first lateral roller comprises a contacting region. Preferably the second lateral roller comprises a contacting region.

Preferably the first lateral roller and the second lateral roller are arranged to rotate about a roller axis (roller drive shaft). Preferably the roller axis is arranged to move in the engagement direction (extending from a rear position to a front position) from the disengaged position to the engaged position. Preferably the first direction extends from the drive means (motor(s)) to the head. Preferably the axis is arranged to move away from the drive means (motor(s)).

The roller axis may be arranged perpendicularly relative to a drive axis of the drive means (motor(s)).

Preferably a forward most portion of the contact regions locate at a position further in the first direction compared to a forward most portion of the drive transmitting means.

Preferably the forward most surface of the drive transmitting means is recessed relative to the forward most surfaces of the first lateral roller and the second lateral roller.

Preferably the contacting regions of the lateral rollers project in the first direction to a position beyond the drive transmitting means.

Preferably the first and second lateral portions provide frictional contact zones.

The first lateral roller may be arranged to frictionally engage the wheel. The second lateral roller may be arranged to frictionally engage the wheel. The drive transmitting means may be arranged to be maintained in a position directly opposing a ground engaging surface of the wheel.

The drive transmitting means may comprise a gear mechanism. The drive transmitting means may comprise a gear train.

The drive transmitting means may comprise a first gear mechanism and a second gear mechanism. The first gear mechanism may transmit drive to the first lateral roller and the second gear mechanism may transmit drive to the second lateral roller. The first gear mechanism may receive drive from a first motor and the second gear mechanism may receive drive from a second motor. The first gear mechanism and the second gear mechanism may receive drive from a single (sole/shared) motor.

The apparatus unit may comprise actuation means. The actuating means may be arranged to move the trailer drive unit between the first (disengaged) position and the second (engaged) position.

According to a second aspect of the present invention there is provided a trailer comprising apparatus for moving the trailer, the apparatus for moving the trailer comprising a trailer drive unit and a mounting mechanism, the trailer drive unit comprising:

drive means, a first lateral roller, a second lateral roller, and drive transmitting means located between the first lateral roller and the second lateral roller;

wherein the drive transmitting means receives drive from the drive means and transmits the drive to the first lateral roller and the second lateral roller, wherein the first lateral roller and the second lateral roller are arranged to move in an engagement direction between a first position and a second position and, in which, in the second position the first lateral roller and the second lateral roller are arranged to be urged against a ground contacting surface of a wheel in order to transmit drive from the drive means to the wheel.

According to a third aspect of the present invention there is provided a method of moving a trailer comprising mounting apparatus for moving the trailer to the trailer wherein the apparatus for moving the trailer comprises a trailer drive unit comprising:

drive means,
a first lateral roller,
a second lateral roller, and
drive transmitting means located between the first lateral roller and the second lateral roller;
wherein the drive transmitting means receives drive from the drive means and transmits the drive to the first lateral roller and the second lateral roller, and
wherein the method comprises moving the first lateral roller and the second lateral roller in an engagement direction between a first position and a second position and, in the second position, urging the first lateral roller and the second lateral roller urged against a ground contacting surface of a wheel in order to transmit drive from the drive means to the wheel.

BRIEF DESCRIPTION OF THE DRAWINGS

The present invention will now be described, by way of example only, with reference to the drawings that follow, in which.

DESCRIPTION OF THE PREFERRED EMBODIMENTS

As mentioned above, current caravan movers 2 suffers from a number of problems which the present invention seeks to address. In particular, there is a significant problem with tyre slippage which the present invention inhibits and aims to prevent.

Figure 1:
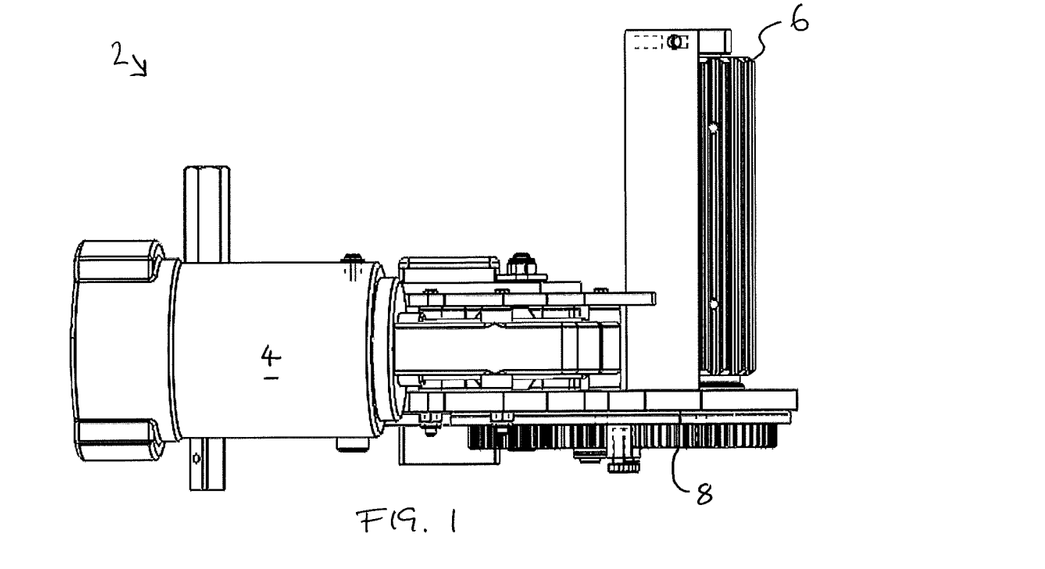
FIG. 1 is a plan view of a prior art caravan mover.

In some prior art caravan movers 2, the roller 6 is supported on a shaft from one lateral end of the roller 6 with the drive transmission being transferred to the roller 6 at this end, as shown in FIG. 1. The end casing of the motor and/or specifically the drive transmission mechanism 8 is typically larger than the diameter of the roller 6. This means that the transmission mechanism 8 must be offset from the tread of the tyre and is usually located on a plane on the inside of the tyre. This means that the position on the tyre at which the roller contacts the tyre surface is limited. On wider tyres this can cause excessive slippage due to a reduced contact patch.

In order to compensate for the reduced contact region, a user may over engage the mover 2 in order to force the roller 6 against the tyre with an excessive force. This puts an additional stress on the motors 4 and gearbox 8 reducing the product and tyre lifespan.

Figure 2:
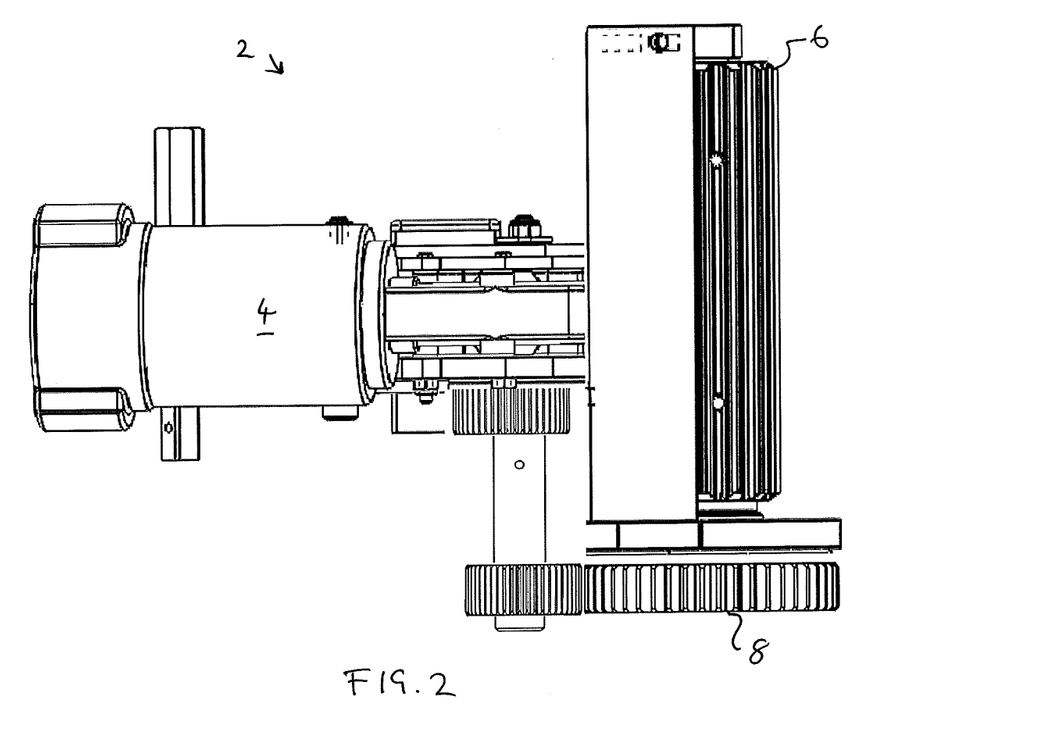
FIG. 2 is a plan view of another prior art caravan mover.

An alternative caravan mover 2 may have a motor 4 mounted centrally relative to the roller 6, as shown in FIG. 2. Again, the gearing and transmission system 8 is provided at one longitudinal end of the roller 6. This gearing and transmission/mechanism projects forwardly from the front surface of the roller 6 and the gearing housing has a greater diameter than that of the roller 6. Accordingly, the gearing/transmission 8 must be spaced inwardly relative to the tread of the tyre. Again, this positioning limits the contact position and contact surface area between the roller 6 and the tread of the tyre.

As shown in FIG. 3 to FIG. 7, a trailer drive unit in the form of a caravan mover 10 comprises a motor 16 (drive means/drive device), a head 14 housing a roller 20 which are linked together by a gear mechanism 22. The caravan mover 10 comprises a housing 24 such that the motor 16 is located within a motor housing 38 and the gear mechanism 22 incorporating a drive transmission mechanism are housed within a central housing 37. The head 14 also comprises a housing 34, 36 which is provided in two sections wherein each section is arranged to partially enclose a respective lateral roller 19, 21.

The aim of the caravan mover 10 is to rotate the wheels of a caravan such that the caravan can be independently moved and positioned without having to manually move the caravan or to secure the caravan to a motorised towing vehicle. The caravan mover 10 thereby provides a roller 20 which is urged and pressed against a ground engaging surface (tread surface 14) of one of the wheels 12 of the caravan.

The roller 20 is arranged to frictionally engage with the tread 14 of the tyre such that rotation of the roller 20 causes the caravan wheel 12 to rotate.

The roller 20 is provided with a frictional surface and this is further enhanced by the roller 20 having a raised pattern which may be generally sinusoidal or wavy. These peaks and troughs on the roller 20 help to efficiently transfer the rotation of the roller 20 to the wheel and to prevent slippage.

Any slippage between the roller 20 and the tyre 12 results in the system being ineffective or failing. The urging force which is used to press the roller 20 against the tread 14 of the tyre 12 can be increased in order to help to prevent the slippage. However, as this urging force increases so does the stress placed on the drive system 22 and, in particular, on the gear mechanism and transmission elements. Accordingly, there is an optimum point at which the increase in the urging force will be overall detrimental. This is further exacerbated since the roller 6 in prior art caravan movers 2 may be supported/driven from a single end and the urging force is thereby effectively transferred through a lever system formed by the transmission/gear mechanism 8. In addition, the roller 6 will naturally be angularly deflected about the end. Again, increasing the urging force will also tend to increase the torque about the supporting end and result in potential failure.

The present invention addresses the above points by providing a support and drive transmission system 22 located centrally on the roller 20 with the roller 20 being provided by a first lateral portion/roller 19 and a second lateral portion/roller 21. In this arrangement, the length of the lateral roller portions 19, 21 are individually shorter than a single roller such that the torque created in the central drive transmission portion is significantly less. The overall combined length of both rollers 19, 21 together may be the same or similar to that of prior art single rollers. Furthermore, each lateral roller portion 19, 21 may be supported at each longitudinal end thereof in respective housing sections 34, 36. Both lateral rollers 19, 21 are urged into contact with the same ground contacting surface of a single tyre/wheel in order to transmit drive from the drive means to the wheel.

Figure 3:
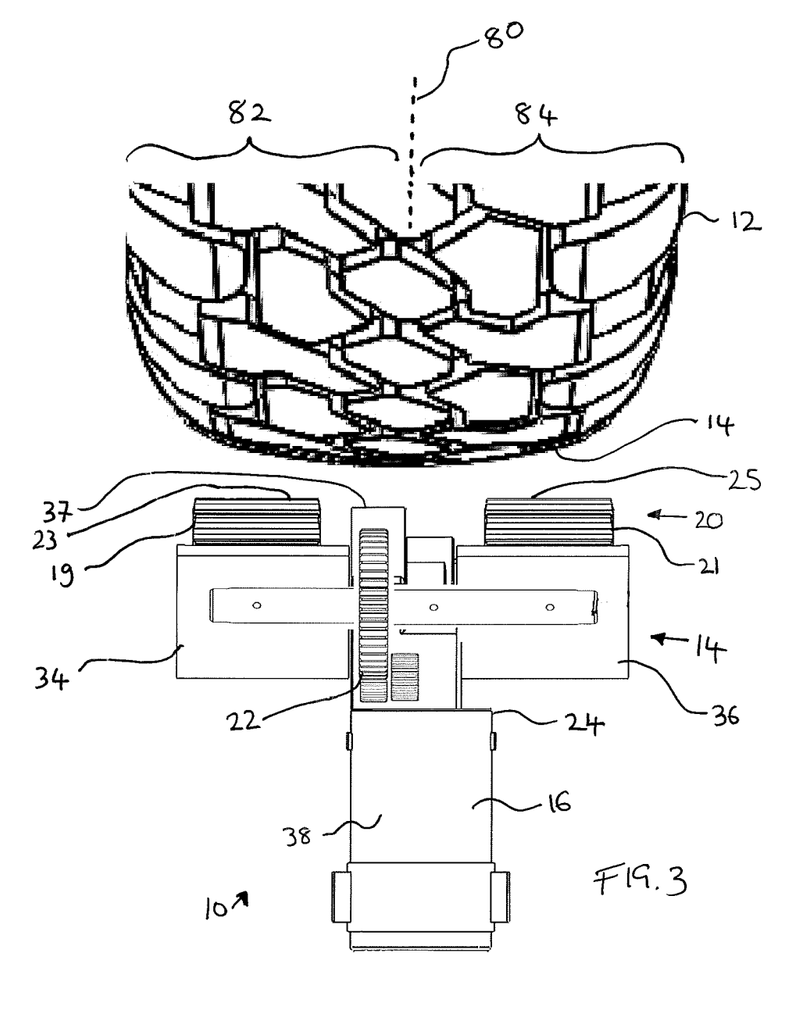
FIG. 3 is a plan view of a preferred embodiment of a preferred embodiment of a caravan mover in a disengaged configuration.
Figure 4:
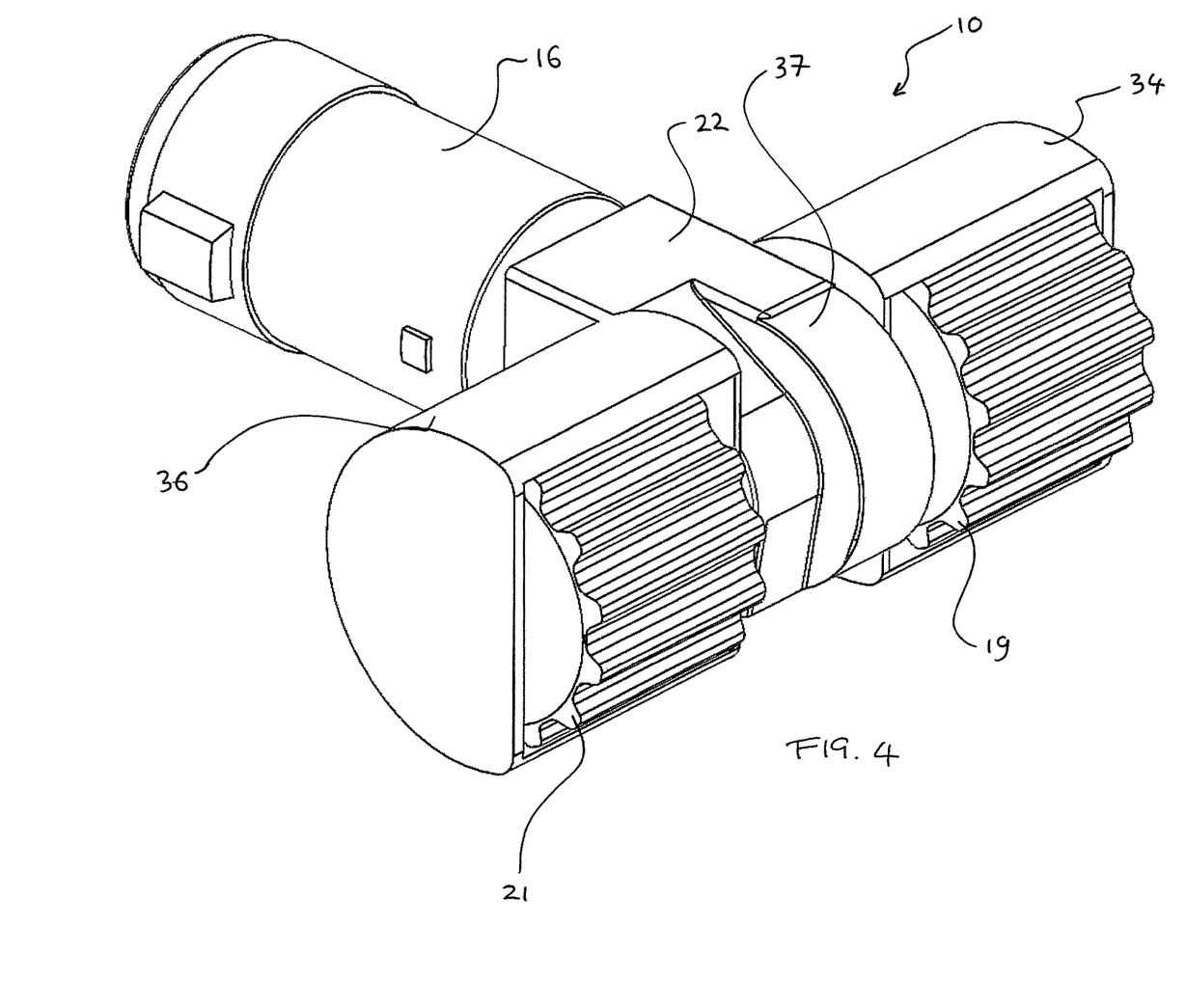
FIG. 4 is a perspective view of a preferred embodiment of a trailer drive unit.

As described previously, the roller 20 of a caravan mover 10 is urged against the tread portion 14 of a tyre 12 which naturally has a slightly curved outer surface, as shown in FIG. 3. This natural curvature also limits the contact area of a single roller which is supported from one end. As it will be appreciated, the present invention provides two lateral roller portions 19, 21 which may be arranged to be urged against the tread surface 14 either side of the mid-line 80 of the tread surface 14. In particular, the first lateral roller 19 contacts a first circumferential zone 82 and the second lateral roller 21 contacts a second circumferential zone 84 in which the two circumferential zones 82, 84 are located either side of a mid-line 80 of the tyre 12. The mid-line 80 bisects the tyre 12 into two equal circumferential zones 82, 84. This thereby increases the overall surface contact area between the roller 20 and the wheel 12. An increase in this surface area thereby allows the urging force to be decreased or for a greater frictional engagement to be achieved by using an equivalent urging force.

The present arrangement results in the roller 20 contacting both the inner circumferential portion 82 of the tyre 12 and also the outer circumferential portion 84 of the tyre 12. In prior art devices, due to the support and drive transmission being located inwardly from the tyre 12, the outer circumferential portion 84 is not contacted.

The caravan mover 10 provides a first contact zone 23 from the first lateral roller 19 and a second zone 25 from the second lateral roller 21. These contact zones 23, 25 are located at the front end of the caravan mover 10 such that the front most portion of the drive transmission 22, 37 located between the two rollers 19, 21 is recessed from these contact zones 21, 23. This prevents the housing 37 of the drive transmission 22 from contacting the tread 14 of the wheel 12 which would interfere with the frictional engagement the caravan mover 10.

Figure 5:
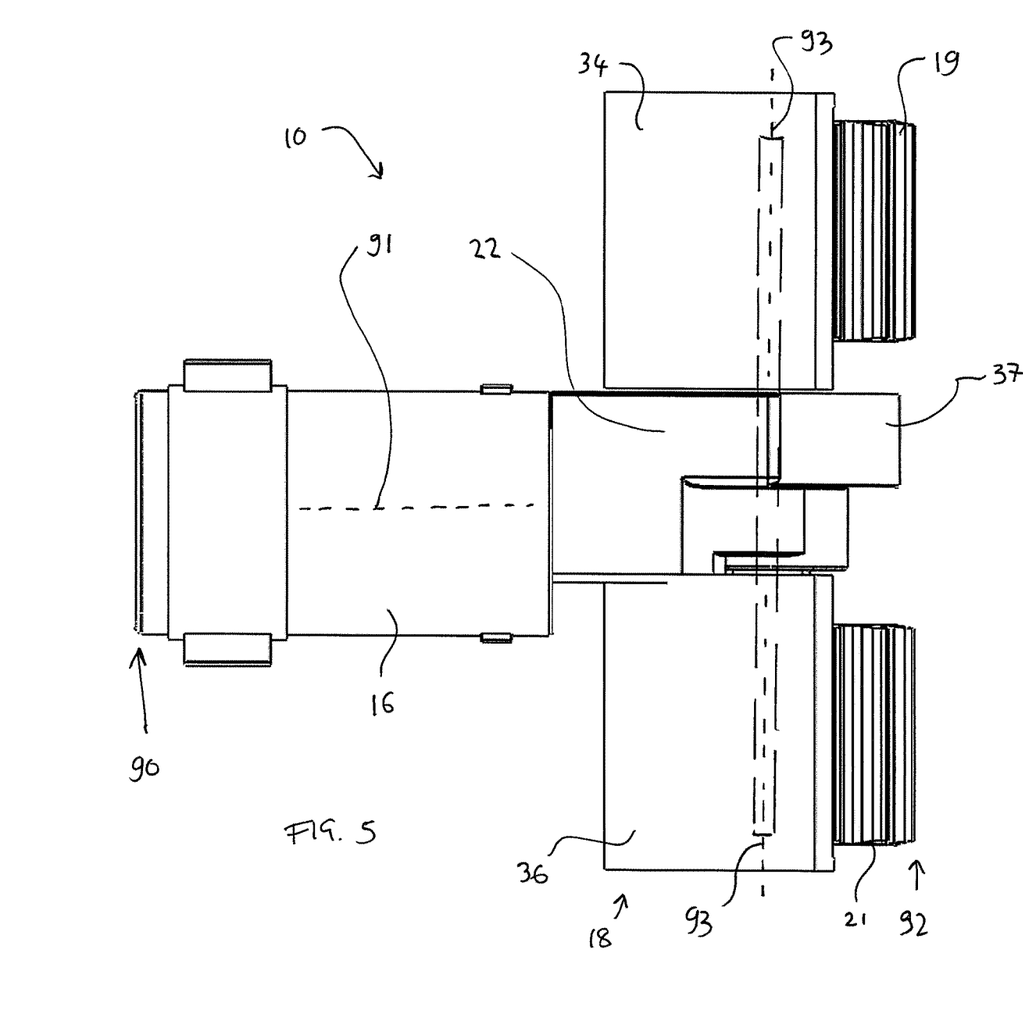
FIG. 5 is a plan view of a preferred embodiment of a trailer drive unit.
Figure 6:
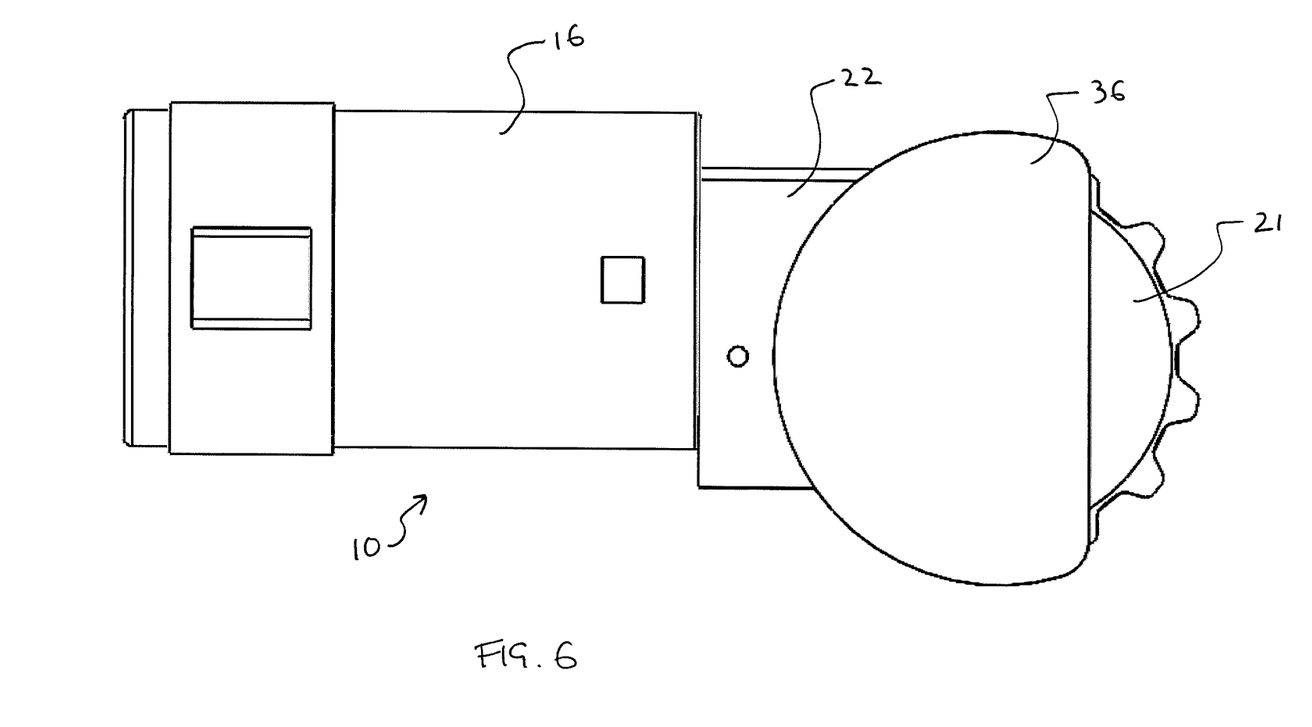
FIG. 6 is a side view of a preferred embodiment of a trailer drive unit.
Figure 7:
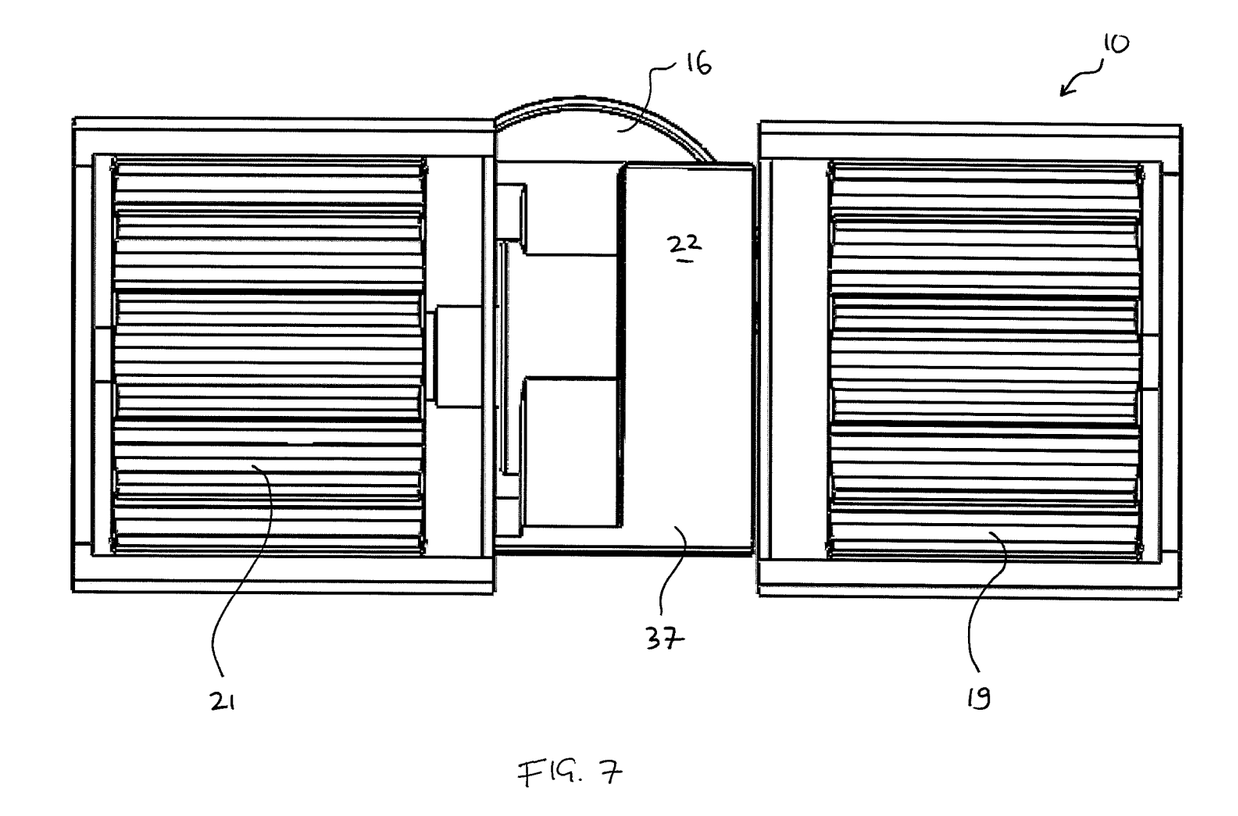
FIG. 7 is a front view of a preferred embodiment of a trailer drive unit.

As shown in FIG. 5, the caravan mover 10 includes a motor 16 which is orientated with a drive shaft with an axis 91 extending in the direction from the motor 16 towards the head 18, i.e. from a rear longitudinal end 90 of the caravan mover 10 to a front longitudinal end 92 of the caravan mover 10. The roller portions 19, 21 are arranged to rotate around a communal shaft 26 which is orientated along an axis 93 perpendicularly to the drive shaft of the motor 16. The caravan mover 10 comprises a gear mechanism 22 to transfer the drive from the motor 16 to the roller portions 19, 21. As previously mentioned, the location, position and use of two roller portions 19, 21 limits and reduces the urging forces being transferred through this gear mechanism 22 and the overall drive transmission system.

Figure 8:
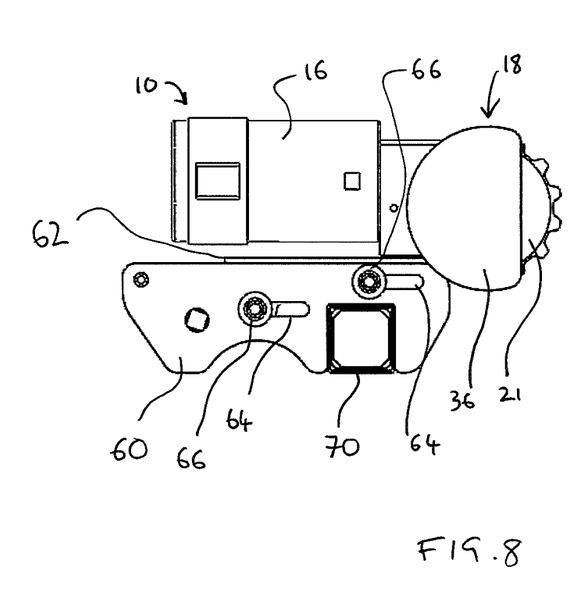
FIG. 8 is a side view of a preferred embodiment of a trailer drive unit in a disengaged position relative to a wheel.
Figure 9:
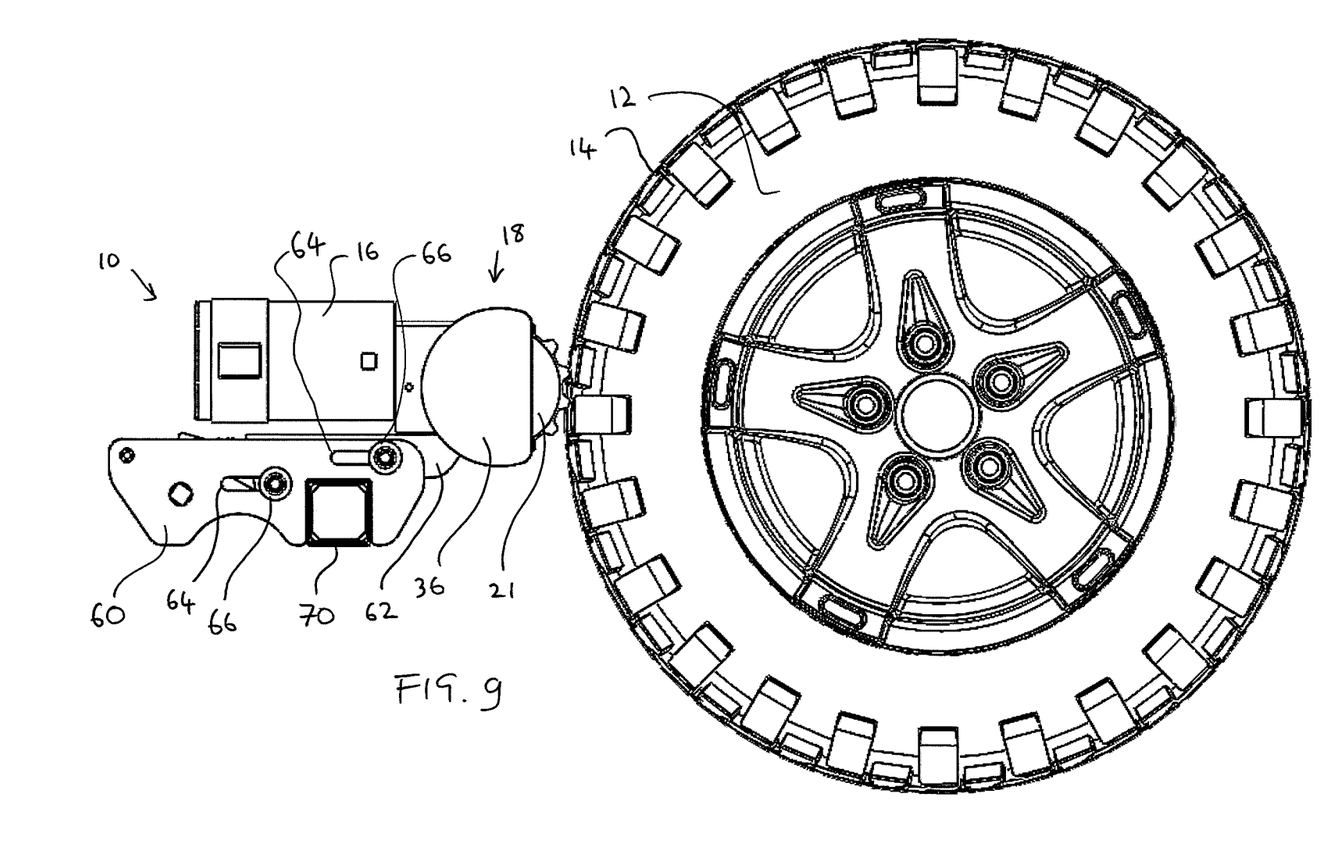
FIG. 9 is a side view of a preferred embodiment of a trailer drive unit in an engaged position relative to a wheel.
Figure 10:
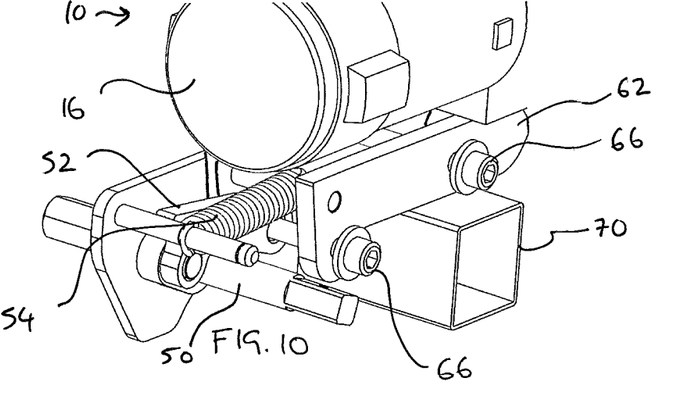
FIG. 10 is a perspective view of a part of a preferred embodiment of a trailer drive unit in a disengaged position.
Figure 11:
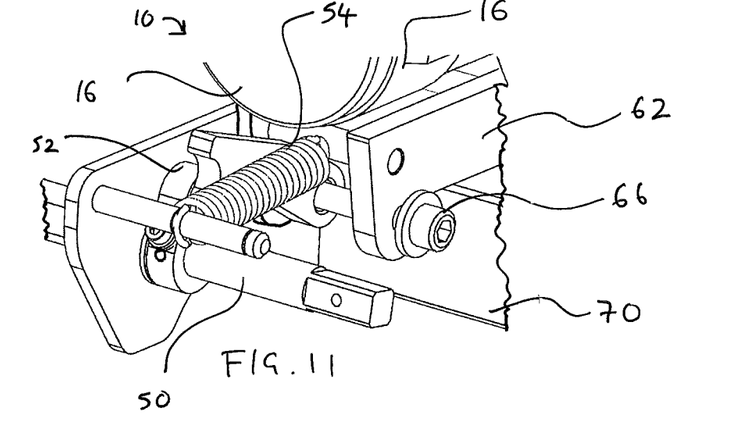
FIG. 11 is a perspective view of a part of a preferred embodiment of a trailer drive unit between the disengaged position and the engaged position.
Figure 12:
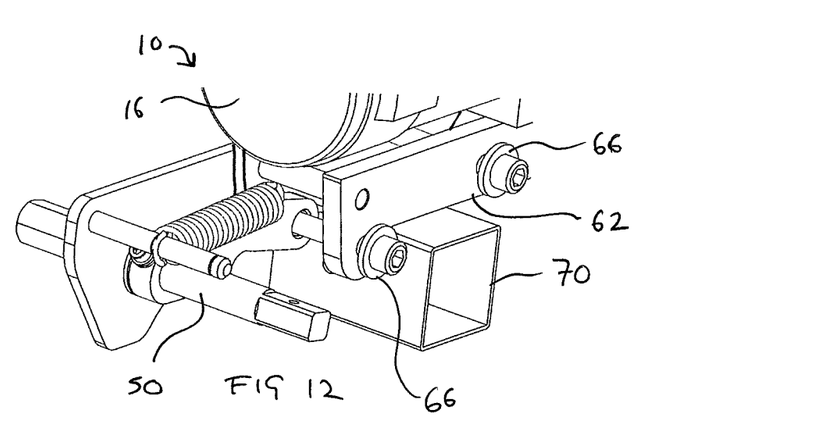
FIG. 12 is a perspective view of a part of a preferred embodiment of a trailer drive unit in the engaged position.
Figure 13:
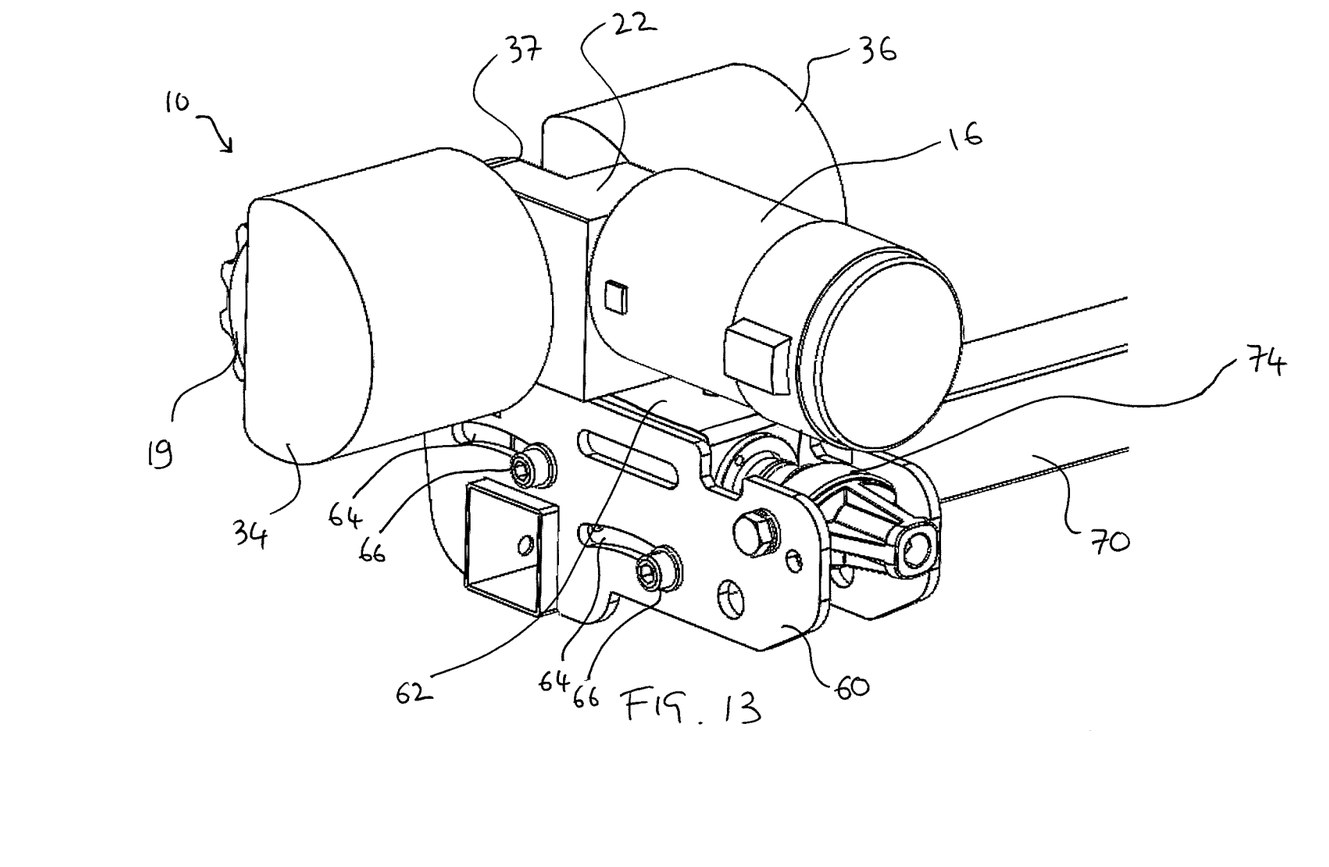
FIG. 13 is a perspective view of another embodiment of a trailer drive unit.

In use, at least the head 18 of the caravan mover 10 is arranged to be moved from a first position/disengaged position (as shown in FIG. 8) to a second position/engaged position (as shown in FIG. 9). The first position provides a disengaged position at which the surfaces of the two lateral rollers 19, 21 are spaced from the tread 14 of the wheel 12. The second position provides an engaged position at which the surfaces of the two roller portions 19, 21 are pressed against the tread 14 of the wheel 12. This movement is provided by an actuating system. The actuating system may comprise a manual system (as shown in FIG. 10 to FIG. 12) or may comprise a motor driven system (as shown in FIG. 13). The actuating system is arranged to move and urge the rollers 19, 21 into engagement with the tread.

The manual actuation system shown in FIG. 10 to FIG. 12, uses an over-cam system to actuate the caravan mover between the disengaged configuration and the engaged configuration. In particular, rotation of an engagement bar 50 causes a cam 52 to rotate pushing the motor 16 and hence the head 18 along the slots 64 in the frame 60. On disengaging the spring 54 causes the motor 16 and the head 18 to return.

The caravan mover 10 may have an automatic actuation system as shown in FIG. 13. In this embodiment, a small auxiliary motor 74 is mounted in the frame 60. As the motor 74 rotates a screw mechanism pushes/pulls the motor 16 (and head 18)/carriage 62 backwards and forwards along the frame 60.

The head 18/caravan mover 10 is moved along a translational axis which extends from the motor 16 towards the tread 14 of the wheel 12. The drive for this actuating system may be provided by the motor 12 or by another drive system such as a hydraulic or pneumatic system/piston or a manual system.

The motor 16 may be powered by a battery which may be mounted directly to the motor housing 38. Alternatively, the power may be provided by a (leisure) battery which may be mounted within or around the caravan and connected to the motor 12 through suitable cables/wires.

As with conventional caravan movers, the operation of the caravan mover 10 may be achieved through a remote control unit which communicates with a control system mounted on the caravan mover 10 or to a control unit mounted on or about the caravan. The caravan mover 10 may include a handset (remote control unit) to communicate with the control unit and may use radio waves, but some embodiments may use Bluetooth. The control unit comprises an electronic control unit (ECU) which is suitably located and is in communication with the battery and the motor. The ECU receives a signal from an operator via the handset and the ECU then selectively provides the required power to the required caravan mover. Generally, wires/cables extend from the battery to the ECU where they are input. The ECU has outputs which are connected to the motor(s) by supply cables/wires/connectors. The ECU receives a signal from the remote control handset and the signal is processed to enable the ECU to deliver the required power to the relevant motor(s).

The caravan mover 10 comprises mounting means in order for the caravan mover 10 to be rigidly secured to a caravan and, in particular, to a part of the chassis of a caravan.

The mounting means (mounting mechanism) comprises a static frame 60 which is fixed to the chassis 70 of the caravan. The caravan mover 10 comprises a carriage 62 which is movably mounted within the frame 60. In particular, the carriage 62 is mounted and constrained to move by slots 64 defined in the frame 60. These slots 64 direct the movement of the rollers 19, 21 (and motor 16 etc.) in a linear direction towards the tread surface 14. These slots 64 may be shaped to provide the required and preferred movement (and direction) between the disengaged potion and the engaged position. The carriage 62 includes lugs 66 or securement elements which slide within these slots 64.

In the engaged position, the rollers 19, 21 are continually urged outwardly and this may be provided by a spring mechanism.

Each roller portion 19, 21 comprises a relatively short roller which is housed within and shrouded by a respective housing 34, 36. Each housing 34, 36 provides an open face through which a front portion of the lateral roller 19, 21 projects. The front most surfaces (the contact zones 23, 25) of the lateral rollers 19, 21 are arranged to project outwardly from the housings 34, 36 such that the housing 34, 36, 32 will not contact the surface 14 of the tyre 12 even if the roller 20 causes the tyre 12 to be pushed (deformed) inwardly slightly due to the urging force. The housing 32, 34, 36 helps to protect the roller 20 and the gears/transmission system 22. This enables the caravan mover 10 to be permanently mounted to the caravan without the need to be frequently removed.

Overall, the present invention provides an urging force to push the roller 20 into engagement with the tread 14 of the tyre 12 wherein the urging force is provided centrally to the roller 20. In the preferred embodiments, the roller 20 is provided as two later roller portions 19, 21. The force is provided to the central part located between the two rollers 19, 21. Furthermore, this urging force passes or is transmitted directly through the gear and transmission mechanism 22 to reduce the wear on these components.

Due to the limited mounting positions available on most typical caravan movers, there are circumstances where movers may not be compatible with certain chassis styles. Drop plates and brackets can be used to aid with fitting but this further increases the weight and complexity of the installation. This also reduces the user's payload. The present invention provides a centrally orientated system in which the caravan mover can be easily mounted and/or minimises the additional weight.

Similarly, due to the limited mounting positions available on larger wheels slippage can occur, this means that the mover sometimes has to be larger and heavier than required to meet the users load demands. The present invention provides the required capability which is considerably lighter and more compact.

Furthermore, prior art caravan movers are specifically manufactured and supplied to be mounted on the different sides of the caravan and thereby have different sided movers/motors/components etc. Similarly, in the process of identifying faults, and which replacement parts may be required and, for which motor, can be difficult, especially if the user is not familiar with how it was installed.

In prior art caravan movers, since the roller is offset from the motor and gearbox a considerable amount of additional force is put through the roller shaft and internal gears, this causes the gears to wear quicker and results in a less reliable product.

Finally, for prior art caravan movers, the motors are sided and two separate motor sides have to be produced and assembled. This is inefficient from a manufacturing standpoint.

In further embodiments, the drive means may comprise a plurality of (individual/independent) motors. This may include a first motor and a second motor. The first motor may be arranged to drive the first lateral roller and the second motor may be arranged to drive the second lateral roller. Each roller may also have an independent/separate drive transmission system (e.g. gear mechanism). In this embodiment, a first motor may drive through a first drive transmission mechanism to the first lateral roller and the second motor may drive through a second drive transmission mechanism to the second lateral roller. Alternatively, the drive means may have a plurality of motors which produce an overall combined drive. For example, a first motor and a second motor may be arranged to drive a single drive transmission mechanism to supply power to both the first lateral roller and the second lateral roller.

The invention claimed is:

1. An apparatus for moving a trailer comprising a trailer drive unit and a mounting mechanism for securing the trailer drive unit to a trailer, the trailer drive unit comprising:
    a drive device,
    a first lateral roller,
    a second lateral roller, and
    a drive system located between the first lateral roller and the second lateral roller;
    wherein the drive system receives drive from the drive device and transmits the drive to the first lateral roller and the second lateral roller,
    wherein the first lateral roller and the second lateral roller are arranged to rotate about a communal drive shaft, and
    wherein the first lateral roller and the second lateral roller are arranged to move in an engagement direction between a first position and a second position, and, in which, in the second position, the first lateral roller and the second lateral roller are arranged to be urged against a same ground contacting tread surface of a single wheel in order to transmit drive from the drive device to the wheel, characterised in that:
    the drive system transmits drive to the communal shaft and the communal drive shaft receives drive from the drive system at a position located between the first lateral roller and the second lateral roller; and
    the communal drive shaft comprises a central engaging portion located between the first lateral roller and the second lateral roller, wherein the central engaging portion receives drive from the drive device;
    the mounting mechanism comprising a frame and a carriage constrained to move in the frame, the frame comprising a guide to guide movement of the trailer drive unit between the first position and the second position, the carriage supporting the first lateral roller and the second lateral roller, the carriage being mounted and constrained to move by slots defined in the frame and, in which, the slots direct movement of the first lateral roller and the second lateral roller in a linear direction towards the ground contacting tread surface and the slots are shaped to provide movement between a disengaged position and an engaged position and in which the drive unit is arranged to move relative to the frame, the apparatus further comprising an actuation system arranged to move the drive unit between the first position and the second position.

2. The apparatus for moving a trailer according to claim 1 in which the first lateral roller is arranged to be urged against a first circumferential zone of the wheel and the second lateral roller is arranged to be urged against a second circumferential zone of the wheel.

3. The apparatus for moving a trailer according to claim 1 in which the first lateral roller is arranged to be urged against a first circumferential zone of the wheel and the second lateral roller is arranged to be urged against a second circumferential zone of the wheel and in which the first circumferential zone is located to one side of a mid-line of the wheel and the second circumferential zone is located to the other side of the mid-line of the wheel.

4. The apparatus for moving a trailer according to claim 1 in which the mid-line bisects the wheel and bisects the ground contacting tread surface into two substantially equal circumferential surfaces.

5. The apparatus for moving a trailer according to claim 1 in which the drive system is arranged, in use, to be aligned with the mid-line of the wheel and in which the mid-line comprises a plane through the middle of the wheel which bisects the wheel into two substantially equal disc sections.

6. The apparatus for moving a trailer according to claim 1 in which, in the first position, the first lateral roller and the second lateral roller are arranged to be disengaged and spaced from the ground contacting tread surface of the wheel so as to prevent the transmission of drive from the drive device to the wheel and in which the apparatus comprises an urging force to urge the first lateral roller and the second lateral roller in the engagement direction.

7. The apparatus for moving a trailer according to claim 1 in which the trailer drive unit comprises an engagement force transmitting system which transmits an engagement force equally and simultaneously to the first lateral roller and the second lateral roller.

8. The apparatus for moving a trailer according to claim 7 in which the force transmitting system transmits the force along a central longitudinal axis of the trailer drive unit and transmits the force to a central longitudinal end of the first lateral roller and to a central longitudinal end of the second lateral roller.

9. The apparatus for moving a trailer according to claim 8 in which the forward most surface of the drive system is recessed relative to the forward most surfaces of the first lateral roller and the second lateral roller.

10. The apparatus for moving a trailer according to claim 8 in which the contacting regions of the lateral rollers project in the first direction to a position beyond the drive system.

11. The apparatus for moving a trailer according to claim 7 in which the force transmitting system transmits the force to an outer longitudinal end of the first lateral roller and to an outer end of the second lateral roller.

12. The apparatus for moving a trailer according to claim 1 in which the drive system is arranged to move towards the ground contacting tread surface of the wheel but contact of the first lateral roller and the second lateral roller with the ground contacting tread surface prevents the drive system contacting the ground contacting tread surface.

13. The apparatus for moving a trailer according to claim 1 in which the first lateral roller comprises a contacting region and the second lateral roller comprises a contacting region and in which the first lateral roller and the second lateral roller are arranged to rotate about a roller axis, wherein the roller axis is arranged to move in the engagement direction extending from a rear position to a front position from the disengaged position to the engaged position and in which forward most portions of the contact regions locate at a position further in the engagement direction compared to a forward most portion of the drive system.

14. The apparatus for moving a trailer according to claim 1 in which the drive system is arranged to be maintained in a position directly opposing a ground engaging surface of the wheel.

15. The apparatus for moving a trailer according to claim 1 in which the drive device comprises a first motor and a second motor and in which the first motor is arranged to drive the first lateral roller and the second motor is arranged to drive the second lateral roller.

16. The apparatus for moving a trailer according to claim 1 in which the drive device comprises a first motor and a second motor and in which the first motor and the second motor provide a single combined drive to simultaneously drive both the first lateral roller and the second lateral roller.

17. A trailer comprising an apparatus for moving the trailer, the apparatus for moving the trailer comprising a trailer drive unit and a mounting mechanism for securing the trailer drive unit to the trailer, the trailer drive unit comprising:

a drive device, a first lateral roller, a second lateral roller, and a drive system located between the first lateral roller and the second lateral roller;

wherein the drive system receives drive from the drive device and transmits drive to the first lateral roller and the second lateral roller, wherein the first lateral roller and the second lateral roller are arranged to rotate about a communal drive shaft, and wherein the first lateral roller and the second lateral roller are arranged to move in an engagement direction between a first position and a second position, and, in which, in the second position, the first lateral roller and the second lateral roller are arranged to be urged against a same ground contacting tread surface of a single wheel in order to transmit drive from the drive device to the wheel, characterised in that:

the drive system transmits drive to the communal shaft and the communal drive shaft receives drive from the drive system at a position located between the first lateral roller and the second lateral roller; and the communal drive shaft comprises a central engaging portion located between the first lateral roller and the second lateral roller, wherein the central engaging portion receives drive from the drive device;

the mounting mechanism comprising a frame and a carriage constrained to move in the frame, the frame comprising a guide to guide movement of the trailer drive unit between the first position and the second position, the carriage supporting the first lateral roller and the second lateral roller, the carriage being mounted and constrained to move by slots defined in the frame and, in which, the slots direct movement of the first lateral roller and the second lateral roller in a linear direction towards the tread surface and the slots are shaped to provide movement between a disengaged position and an engaged position and in which the drive unit is arranged to move relative to the frame, the apparatus further comprising an actuation system arranged to move the drive unit between the first position and the second position.

18. A method of moving a trailer comprising a mounting apparatus for moving the trailer, wherein the mounting apparatus for moving the trailer comprises a trailer drive unit comprising:
  a drive device,
  a first lateral roller,
  a second lateral roller, and
  a drive system located between the first lateral roller and the second lateral roller;
  wherein the drive system receives drive from the drive device and transmits the drive to the first lateral roller and the second lateral roller, and
  wherein the first lateral roller and the second lateral roller are arranged to rotate about a communal drive shaft, characterised in that;
  the drive system transmits drive to the communal drive shaft and the communal drive shaft receives drive from the drive system at a position located between the first lateral roller and the second lateral roller; and
  the communal drive shaft comprises a central engaging portion located between the first lateral roller and the second lateral roller, wherein the central engaging portion receives drive from the drive device, and
  wherein the method comprises securing the trailer drive unit to the trailer and moving the first lateral roller and the second lateral roller in an engagement direction between a first position and a second position, and, in the second position, urging the first lateral roller and the second lateral roller against a same ground contacting tread surface of a single wheel in order to transmit drive from the drive device to the wheel;
  the mounting mechanism comprising a frame and a carriage constrained to move in the frame, the frame comprising a guide to guide movement of the trailer drive unit between the first position and the second position, the carriage supporting the first lateral roller and the second lateral roller, the carriage being mounted and constrained to move by slots defined in the frame and, in which, the slots direct movement of the first lateral roller and the second lateral roller in a linear direction towards the ground contacting tread surface and the slots are shaped to provide movement between a disengaged position and an engaged position and in which the drive unit is arranged to move relative to the frame, the apparatus further comprising an actuation system arranged to move the drive unit between the first position and the second position.

* * * * *